(12) United States Patent
Kawahara et al.

(10) Patent No.: US 6,838,029 B2
(45) Date of Patent: Jan. 4, 2005

(54) METHOD FOR PRODUCING ETHYLENE-VINYL ALCOHOL COPOLYMER RESIN

(75) Inventors: Takaharu Kawahara, Okayama (JP); Toshio Tuboi, Okayama (JP); Yukihiro Ohara, Okayama (JP); Masao Hikasa, Kurashiki (JP); Hiroshi Kawai, Kurashiki (JP)

(73) Assignee: Kuraray Co., Ltd., Kurashiki (JP)

(*) Notice: Subject to any disclaimer, the term of this patent is extended or adjusted under 35 U.S.C. 154(b) by 428 days.

(21) Appl. No.: 10/035,123

(22) Filed: Jan. 4, 2002

(65) Prior Publication Data
US 2002/0100997 A1 Aug. 1, 2002

(30) Foreign Application Priority Data

Jan. 19, 2001 (JP) .................................. 2001-011051

(51) Int. Cl.[7] .............................................. C08L 31/04
(52) U.S. Cl. ......................................... 264/141; 524/557
(58) Field of Search ............................. 264/141, 142, 264/204; 524/557; 528/494

(56) References Cited

U.S. PATENT DOCUMENTS

| | | |
|---|---|---|
| 3,847,845 A | 11/1974 | Tada et al. |
| 5,118,743 A | 6/1992 | Yonezu et al. |
| 5,146,822 A | 9/1992 | Noda et al. |
| 5,322,866 A | 6/1994 | Mayer et al. |
| 6,184,288 B1 | 2/2001 | Ninomiya et al. |
| 6,613,833 B2 * | 9/2003 | Kawahara et al. .......... 524/557 |
| 6,686,405 B1 * | 2/2004 | Kawahara et al. .......... 524/127 |
| 2002/0135098 A1 * | 9/2002 | Kawai et al. ............... 264/143 |

FOREIGN PATENT DOCUMENTS

| | | |
|---|---|---|
| EP | 0 937 557 A1 | 10/1977 |
| EP | 0 408 503 A2 | 7/1990 |
| EP | 0 892 006 A2 | 7/1998 |
| EP | 0 408 503 A3 | 7/1999 |
| EP | 1 072 616 | 1/2001 |
| EP | 1 179 546 | 2/2002 |
| JP | 49-20615 B | 5/1974 |
| JP | 55012108 A | 1/1980 |
| JP | 55-19242 B | 5/1980 |
| JP | 57034148 A | 2/1982 |
| JP | 64-66262 | 9/1987 |
| JP | 3-61507 | 3/1991 |
| JP | 11058500 A | 3/1999 |
| JP | 11058501 | 3/1999 |
| WO | WO 97/38025 | 10/1997 |
| WO | WO 99/12714 | 3/1999 |
| WO | WO99/05213 | 4/1999 |

* cited by examiner

*Primary Examiner*—Mark Eashoo
(74) *Attorney, Agent, or Firm*—Oblon, Spivak, McClelland, Maier & Neustadt, P.C.

(57) ABSTRACT

The present invention relates to a method of producing an ethylene-vinyl alcohol copolymer resin.

20 Claims, 2 Drawing Sheets

METHOD FOR PRODUCING ETHYLENE-VINYL ALCOHOL COPOLYMER RESIN

BACKGROUND OF THE INVENTION

1. Field of the Invention

The present invention relates to a method for producing an ethylene-vinyl alcohol copolymer (EVOH) resin, and to a method for producing EVOH resin pellets by cutting the EVOH resin produced according to the former method.

More precisely, the invention relates to a method for producing an EVOH resin, which comprises introducing an alcohol-containing EVOH solution into an apparatus, and contacting the solution with water in the apparatus, thereby letting alcohol along with water out of the vessel and transferring the resulting aqueous EVOH composition into an extruder, kneading it in melt therein, and extruding it out of the extruder; and to a method for producing EVOH resin pellets by cutting the EVOH resin produced according to the former method.

2. Description of the Related Art

Ethylene-vinyl alcohol copolymer is a useful polymer material having good oxygen barrier properties, aroma retentiveness, oil resistance, antistatic properties and mechanical strength. It is widely used for films, sheets, containers, etc. One general method of producing EVOH comprises saponifying an ethylene-vinyl ester copolymer that is obtained through polymerization of ethylene with a vinyl ester of a fatty acid, such as vinyl acetate or the like, in an alcohol-containing organic solvent, in the presence of a saponification catalyst.

For post-treating the alcohol solution of EVOH obtained through saponification Japanese Patent Publication No. 38634/1972 discloses a method of producing EVOH pellets which comprises adding water to a methanolic solution of EVOH optionally-concentrated so that no EVOH deposit is formed therein in order to prepare a methanol-water mixed solution of EVOH that contains from 15 to 45% by weight of EVOH, then extruding it into strands in water or in a methanol-water mixed solution having a lower methanol concentration than the EVOH solution, at 50° C. or lower, and thereafter cutting the strands. The application states that the concentration of methanol in the coagulating bath preferably is between 10 and 50% by weight. The application further states that the pellets thus obtained are porous and can be readily washed with water to remove the saponification catalyst residue and that the pellets are easy to handle in the subsequent washing and drying step.

Regarding the process of adding water to a methanol solution of the EVOH after saponification, Example 1 of Japanese Patent Laid-Open No. 90927/1999 describes a method of producing a completely transparent, uniform methanol/water solution of EVOH, which comprises adding an aqueous methanol solution having a water content of 62.5% by weight to a methanol solution of EVOH having an EVOH content of 30% by weight, under an azeotropic condition at 100° C. to 110° C. under a pressure of 3 kg/cm$^2$G so as to remove methanol until the EVOH content of the resulting EVOH solution increases up to 40% by weight.

However, in the method of producing EVOH pellets by coagulating an EVOH solution that contains a large amount of methanol, the alcohol often vaporizes in the step of coagulation. The alcohol vapor worsens the working environment and injures the health of the workers, and, in addition, it has negative influences on the area around the working site. Therefore, improving the method is desired.

Where EVOH having an ethylene content of less than 20 mol % or a degree of saponification of less than 95% is produced according to the method as above, EVOH strands are difficult to form in the coagulating bath since the coagulation rate of EVOH in the bath is low. As a result, the EVOH strands, even though formed, are often miscut and are often contaminated with fine powder. Stable production of EVOH pellets by this method is difficult. Moreover EVOH having an ethylene content of 20 mol % or more and a degree of saponification of 95% or more is poorly coagulated or is difficult to handle, when it is coagulated in strands at an increased coagulation rate through an increased number of nozzles so as to increase the production efficiency, and, as a result, its strands are often miscut and stable production of its pellets is not easy.

In addition, the EVOH pellets obtained in the conventional methods contain alcohol, catalyst residues, alkali metal salts, and therefore require washing to remove them. To increase the washing speed, elevating the temperature of the washing liquid will be effective. However, if the temperature is elevated too high, the pellets will fuse as they contain alcohol.

Various methods are known for molding EVOH pellets. In general, EVOH pellets are molded in extrusion or injection molding apparatus. To mold in this manner, the starting material of EVOH resin pellets is first fed into the hopper of an extruder where, in general, the temperature of the resin melt should not be lower than 200° C. However EVOH containing no additive will readily degrade if molded in melt in this condition, often forming fish eyes or hard spots in the products to lower the quality of the products.

A known method for improving the long-run workability of EVOH and for preventing EVOH moldings from having surface defects such gels or hard spots that worsen the outward appearance of the moldings is to add minor components such as acid substances and/or metal salts to the EVOH. For example, Japanese Patent Laid-Open No. 66262/1989, discloses an EVOH composition which contains from 0.0005 to 0.05% by weight of a Group 2 metal salt, from 0.002 to 0.2% by weight of an acid having a pKa of at least 3.5 and a boiling point of not lower than 180° C., and from 0.01 to 0.2% by weight of an acid having a pKa of at least 3.5 and a boiling point of not higher than 120° C., and which has specific flow properties.

The following are examples of the method for obtaining EVOH pellets containing minor components as above: (1) A method of spraying an aqueous solution of minor components on EVOH pellets followed by mixing them in a Henschel mixer and drying them (Japanese Patent Laid-Open No. 12108/1980). (2) A method of adding powdery minor components to EVOH pellets followed by blending them in dry in a super-mixer (Japanese Patent Laid-Open No. 34148/1982). (3) A method of dipping EVOH pellets in an aqueous solution of minor components followed by dewatering and drying them (Japanese Patent Laid-Open No. 66262/1989). (4) A method of controlling the water content of EVOH pellets to fall between 20 and 80% by weight followed by contacting the EVOH pellets with an aqueous solution of at least one compound selected from boron compounds, acetates and phosphoric acid compounds (WO99/05213).

In the methods (1) and (2), however, the minor components added to the EVOH pellets could not be uniformly dispersed. In addition, the amount of the minor components to be added is difficult to control, and products of stable quality are difficult to obtain. In methods (3) and (4) it is possible to control the content of the minor components in the EVOH pellets by controlling the concentration of the solution of the minor components.

As mentioned above, pellets of EVOH having an ethylene content of less than 20 mol % and those having a degree of saponification of less than 95% are difficult to produce stably, and they often form crumbs. Even EVOH having an ethylene content of at least 20 mol % and EVOH having a degree of saponification of at least 95% often form crumbs when they are processed into strands at high speed through an increased number of nozzles for enhancing the production efficiency. However, when the crumbed EVOH is processed according to the method of (3) or (4), the minor components are difficult to mix uniformly with it, and, as a result, products of stable quality are difficult to obtain.

From the viewpoint of the production process, the conventional method of dipping EVOH pellets in a treating solution that contains an acid substance and/or a metal salt is troublesome as it requires a treating bath or column for dipping the pellets therein. In the treating solution used in such a treating bath or column, the acidic substance and/or the metal salt are reduced as they are consumed by EVOH treated with it. Therefore, the used solution shall be discarded as waste, or may be recovered and recycled. For the latter, however, a suitable amount of fresh acidic substance and/or metal salt must be added to the used solution. Discarding the waste of the used solution as such is undesirable for environmental protection, and it requires some additional equipment for waste treatment. On the other hand, in case where the used solution is recovered and recycled, it also requires additional equipment for adding fresh acidic substance and/or metal salt to the used solution and additional equipment for removing impurities such as typically oligomers from the used solution for obtaining products of stable quality. The conventional methods involve serious problems in that they require large-scale treating equipment and long treating time and therefore the production costs increase.

For melt-extruding wet EVOH, proposed are a method of extruding it in melt at a specific level of energy (Japanese Patent Laid-Open No. 58500/1999); and a method of extruding it in melt under specific control of the cylinder temperature of the extruder used (Japanese Patent Laid-Open No. 58501/1999). However, these references are silent on the problem of how to control the water content of EVOH in melt extrusion.

SUMMARY OF THE INVENTION

One aim of the present invention is to provide an environmentally reliable method for producing an EVOH resin that ensures efficient removal of alcohol. Another aim of the invention is to provide a method for producing pellets of the EVOH resin, which enables stable production and rapid washing of the pellets.

The EVOH resin pellets thus produced can enjoy stable extrusion and thermal stability in long-run extrusion working lines.

The present inventors have found that the problems noted above can be solved by providing a method for producing an EVOH resin which comprises: preparing an aqueous EVOH composition by contacting an alcohol-containing EVOH solution with water and, letting alcohol and water out of the system, and feeding the aqueous EVOH composition into an extruder and kneading it in melt therein.

Specifically, one aspect of the invention is a method for producing an EVOH resin, which comprises introducing into an apparatus an EVOH solution that contains at least 50 parts by weight of an alcohol having a boiling point of not higher than 100° C., relative to 100 parts by weight of EVOH, and contacting the solution with water in the apparatus, thereby letting alcohol along with water out of the apparatus and transferring the resulting aqueous EVOH composition that contains from 0 to 10 parts by weight of the alcohol and from 10 to 1000 parts by weight of water, relative to 100 parts by weight of EVOH therein, out of the apparatus (step 1), and feeding the aqueous EVOH composition into an extruder, kneading it in melt therein, and then extruding the copolymer out of the extruder (step 2).

In the above method, the ethylene content of EVOH to be processed is preferably between 3 and 70 mol % and the degree of saponification is preferably at least 80 mol %. Preferably, the alcohol to be used therein is methanol.

Preferably the EVOH solution is introduced into a vessel and contacted with water vapor in the vessel, thereby letting the alcohol out along with water vapor. More preferably, the EVOH solution is continuously introduced into a column vessel and contacted with water vapor in the vessel. Even more preferably, the EVOH solution is introduced into the vessel through its upper part with water vapor introduced through its lower part thereby causing the EVOH solution to contact the water vapor in countercurrent flow, and the resulting aqueous EVOH composition is taken out of the vessel through its lower part with alcohol along with water vapor being let out through its upper part.

Preferably in the step 2, the temperature of the resin melt in the extruder is between 70 and 170° C. Also preferably, the water content of the extruded resin melt is between 5 and 40% by weight. Also preferably, water is fed into the extruder or excess water is removed from it to control the water content of the resin in the extruder. Also preferably in the step 2, the aqueous EVOH composition is kneaded in melt in the extruder with at least one additive selected from carboxylic acids, boron compounds, phosphoric acid compounds, alkali metal salts and alkaline earth metal salts. More preferably, an aqueous solution of the additive is fed into the extruder. Preferably, a wash is fed into the extruder and it is discharged from it through at least one site downstream of the wash inlet site to thereby remove the saponification catalyst residue from the resin melt.

Preferably, the aqueous EVOH composition taken out of the apparatus in step 1 is cut into pellets, and the resulting pellets are fed into the extruder in step 2. More preferably, the pellets are dipped in a wash to remove the saponification catalyst residue from them, and then fed into the extruder. Even more preferably, the pellets are continuously washed in a column vessel. Preferably, the pellets are dipped in an aqueous solution containing at least one additive selected from carboxylic acids, boron compounds, phosphoric acid compounds, alkali metal salts and alkaline earth metal salts to thereby add the additive to the pellets, and then they are fed into the extruder.

Preferably, the aqueous EVOH composition of step 1 is fed uncut, into the extruder in step 2. More preferably, the aqueous EVOH composition is, fed uncut, into the extruder in step 2, and a wash is fed into the extruder and discharged from it through at least one site downstream of the wash inlet site to remove the saponification catalyst residue from the resin melt.

The invention encompasses a method for producing EVOH resin pellets, which comprises cutting the EVOH resin extruded in step 2. Preferably, the pellets are cut and dried to have a water content of at most 1% by weight.

DETAILED DESCRIPTION OF THE INVENTION

Figure 1:
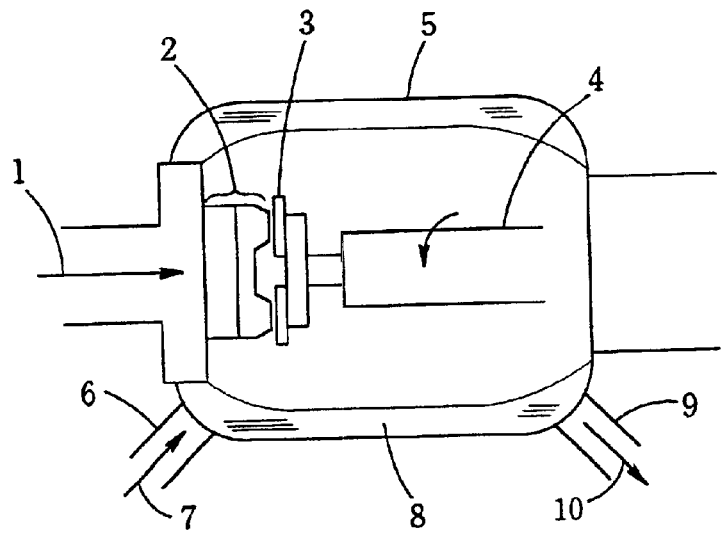
FIG. 1 is a schematic view showing one example of the constitution of a hot cutter used in the invention.

The method for producing an EVOH resin of the invention comprises a step of introducing an alcohol-containing EVOH solution into an apparatus, and contacting it with water in the apparatus thereby letting the alcohol out along with water and transferring the resulting aqueous EVOH composition out of the apparatus (step 1), into an extruder, kneading it in melt therein, and then extruding the copolymer out of the extruder (step 2). The term EVOH resin is intended to indicate an EVOH resin composition finally obtained after various treatments of EVOH that is prepared through polymerization followed by saponification, for example, by washing EVOH, controlling the water content of EVOH and adding additives to EVOH. Naturally, it shall encompass the EVOH resin composition in the extruder and also the EVOH resin composition just after extrusion in step 2 of the invention. Accordingly, the EVOH resin may contain water, various additives and impurities.

In general, EVOH for use in the invention is obtained by saponifying an ethylene-vinyl ester copolymer. Its ethylene content generally is between 3 and 70 mol %. For ensuring good melt moldability of the resin and to give moldings with good gas barrier properties, the ethylene content of EVOH preferably is between 10 and 60 mol %, more preferably between 20 and 55 mol %, most preferably between 25 and 55 mol %. To ensure moldings with good gas barrier properties the degree of saponification of the vinyl ester moiety in EVOH is generally at least 80 mol %, but preferably at least 95 mol %, more preferably at least 99 mol %.

EVOH having an ethylene content of from 3 to 20 mol % is preferred, as they are soluble in water. Aqueous solutions of EVOH of this type are an excellent coating material with good property capable of being formed into coating films with good barrier properties.

EVOH having a degree of saponification of from 80 to 95 mol % may be used for improving the moldability and workability of the resin. Though it may be used alone, it is preferably blended with EVOH having a degree of saponification of higher than 99 mol %.

EVOH having an ethylene content of from 3 to 20 mol % and EVOH having a degree of saponification of from 80 to 95 mol % are both problematic in that the methanol solution of EVOH of either type is difficult to extrude and coagulate into strands in a coagulating bath. The invention has made it possible to readily coagulate EVOH of these types and to stably produce their pellets. This is a significant aspect of the invention.

In general, the melt moldability of EVOH having an ethylene content of less than 3 mol % is not good, and the waterproofness, the hot water resistance and the gas barrier properties at high humidity of EVOH of the type are often poor. On the other hand, the barrier properties and the printability of EVOH having an ethylene content of greater than 70 mol % are often poor. The barrier properties, the yellowing resistance and the moisture resistance of EVOH having a degree of saponification of less than 80 mol % are often unsatisfactory. A method of producing EVOH for use in the invention is described clearly below. For example, ethylene is polymerized with a vinyl ester in any desired manner including solution polymerization, suspension polymerization, emulsion polymerization and bulk polymerization and in any desired mode of continuous or batchwise polymerization. One example of batchwise solution polymerization to produce the polymer is described, for which the polymerization condition is as follows.

Solvent

Alcohols having a boiling point of not higher than 100° C. are used. In view of the solubility of ethylene-vinyl ester copolymers and EVOH therein and of the handlability thereof, such alcohols are used. The boiling point of the alcohols to be used must not be higher than 100° C., since this allows the alcohol to be removed from the process with the water. Preferably, the boiling point of the alcohols for use herein is not higher than 80° C., more preferably not higher than 70° C.

Alcohols having a boiling point of not higher than 100° C. include, for example, methanol, ethanol, n-propanol, isopropanol and t-butanol. Methanol is especially preferred for use herein.

Catalyst

Usable are azonitrile-type initiators such as 2,2-azobisisobutyronitrile, 2,2-azobis-(2,4-dimethylvaleronitrile), 2,2-azobis-(4-methoxy-2,4-dimethylvaleronitrile) and 2,2-azobis-(2-cyclopropylpropionitrile); and organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Vinyl ester

Usable are vinyl esters of fatty acids (e.g., vinyl acetate, vinyl propionate, vinyl pivalate). Preferred is vinyl acetate. EVOH for use herein may contain a comonomer component of a vinylsilane compound in an amount of from 0.0002 to 0.2 mol %. The vinylsilane compound includes, for example, vinyltrimethoxysilane, vinyltriethoxysilane, vinyltri(β-methoxyethoxy)silane and γ-methacryloxypropylmethoxysilane. Of those, preferred are vinyltrimethoxysilane and vinyltriethoxysilane.

The polymerization condition are as follows.

(1) Temperature: 20° C. to 90° C., preferably 40° C. to 70° C.

(2) Time: 2 to 15 hours, preferably 3 to 11 hours.

(3) Degree of polymerization: 10% to 90%, preferably 30% to 80% relative to the vinyl ester used.

(4) Polymerized resin content of the solution: 5% to 85%, preferably 20% to 70%.

(5) Ethylene content of the copolymer: 3 to 70mol %, preferably 10 to 60 mol %, more preferably 20 to 55 mol %, most preferably 25 to 55 mol %.

Except for ethylene and vinyl esters, any other minor comonomers capable of copolymerizing with them may be present in the polymerization system. The comonomers include, for example, α-olefins such as propylene, isobutylene, α-octene and α-dodecene; unsaturated acids such as acrylic acid, methacrylic acid, crotonic acid, maleic acid and itaconic acid, and their anhydrides, salts, or monoor di-alkyl esters; nitriles such as acrylonitrile and methacrylonitrile; amides such as acrylamide and methacrylamide; olefinsulfonic acids such as ethylenesulfonic, acid, allylsulfonic acid and methallylsulfonic acid, and their salts; alkyl vinyl ethers, vinyl ketones, N-vinylpyrrolidone, vinyl chloride and vinylidene chloride.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl ester is purged away. To purge the non-reacted vinyl ester, for example, the copolymer solution from which ethylene has been evaporated away is continuously run into a column filled with raschig rings, through the upper part of the column at a constant flow rate, while a vapor of an organic solvent, preferably an alcohol having a boiling point of not higher than 100° C., most preferably methanol is jetted into the column through its lower part, whereby a mixed vapor of the organic solvent and the non-reacted vinyl ester is run off from the column through its top, and the copolymer solution from which the non-reacted vinyl ester was removed is taken out of the column through its bottom.

An alkali catalyst is added to the copolymer solution from which the non-reacted vinyl ester was removed, and the vinyl ester moiety of the copolymer is saponified. For this, employable is any of continuous or batchwise saponification. The alkali catalyst includes, for example, sodium hydroxide, potassium hydroxide, and alkali metal alcoholates. One example of batchwise saponification is described, for which the condition is as follows.

(1) Ethylene-vinyl ester copolymer content of the solution: 10% to 50%.
(2) Reaction temperature: 30° C. to 65° C.
(3) Amount of catalyst: 0.02 to 1.0 equivalent (based on the vinyl ester moiety).
(4) Time: 1 to 6 hours.

The EVOH solution thus obtained generally contains at least 50 parts by weight, relative to 100 parts by weight of EVOH therein, of the alcohol having a boiling point of not higher than 100° C. The alcohol content of the solution is preferably at least 70 parts by weight, more preferably at least 80 parts by weight. Also preferably, the alcohol content is at most 1000 parts by weight, more preferably at most 500 parts by weight. Having the alcohol content falling within the range, the EVOH solution is well fluid and the EVOH resin is produced efficiently. The alcohol is preferably methanol.

The EVOH solution after saponification is not limited to the alcohol solution as above. If desired, it may contain any other solvent such as water, and may be in the form of a solution in such a mixed solvent. For adding water thereto, for example, referred to are the prior art methods mentioned above.

In the step 1 of the invention, an EVOH solution containing at least 50 parts by weight, relative to 100 parts by weight of EVOH therein, of an alcohol having a boiling point of not higher than 100° C., such as that prepared in the manner described above, is introduced into an apparatus and contacted with water therein, thereby letting the alcohol along with water out of the apparatus and transferring the resulting aqueous EVOH composition that contains from 0 to 10 parts by weight of the alcohol and from 10 to 1000 parts by weight of water, relative to 100 parts by weight of EVOH therein, out of the apparatus.

The apparatus is not specifically defined. For example, the EVOH solution may be contacted with water in a vessel, or may be contacted with water in an apparatus for kneading such as extruder. Preferably, it is contacted with water in a vessel, more preferably with water vapor for large-scale treatment.

In one preferred embodiment of step 1 of the invention, the EVOH solution containing at least 50 parts by weight, relative to 100 parts by weight of EVOH therein, of an alcohol having a boiling point of not higher than 100° C. is introduced into a vessel and contacted with water vapor therein, thereby letting the alcohol along with water vapor out of the vessel and taking the resulting aqueous EVOH composition that contains from 0 to 10 parts by weight of the alcohol and from 10 to 1000 parts by weight of water, relative to 100 parts by weight of EVOH therein, out of the vessel.

The mode of contacting the EVOH solution with water vapor in a vessel is not specifically defined, and may be any of continuous or batchwise modes. The shape of the vessel to be employed for it is not also specifically defined. For continuous systems, however, preferred is a column vessel; and for batchwise systems, preferred is a tank vessel. From the viewpoint of production efficiency, preferred are continuous systems for industrial production. Examples of the column vessel are plate columns such as porous plate columns or bubble-cap towers, and packed columns such as those filled with a ring-type filler.

The EVOH solution and water vapor introduced into a vessel are preferably contacted with each other in countercurrent flow therein, from the viewpoint of the efficiency of alcohol removal. For example, one preferred embodiment of the method comprises introducing an EVOH solution into a column vessel through its upper part and water vapor through its lower part so that the two are contacted with each other in countercurrent flow in the vessel, and taking the resulting aqueous EVOH composition out of the vessel through its lower part with the released alcohol being let out through the upper part of the vessel along with water vapor. The alcohol vapor and water vapor having been thus let out through the upper part of the column vessel are condensed in a condenser and the resulting aqueous alcohol solution is taken out. If desired, it may be purified and recycled.

Regarding the amount of water vapor to be introduced into the vessel, if it is too small, the alcohol removal efficiency will be low; but if too large, it will increase the production costs. Accordingly, the amount of water vapor to be introduced is preferably between 0.3 and 30 times in terms of the ratio by weight to the amount of the EVOH solution introduced into the vessel, more preferably between 0.5 and 10 times, even more preferably between 0.7 and 5 times. The water vapor to be contacted with the EVOH solution may contain at most 10 parts by weight of an alcohol, relative to 100 parts by weight of the water vapor. However, for more efficient alcohol removal, it is desirable that the water vapor does not contain an alcohol. Preferably, the temperature in the vessel is between 100 and 150° C. If the temperature in the vessel is lower than 100° C., the aqueous EVOH composition produced therein may not be very fluid, and will gel in the vessel or will clog the vessel. More preferably, the temperature is not lower than 110° C., even more preferably not lower than 120° C. On the other hand, if the temperature in the vessel is higher than 150° C., the EVOH may deteriorate. More preferably, the temperature is not higher than 140° C.

Regarding the pressure in the vessel, if it is too low, the alcohol removal efficiency will be low; but if too high, the temperature of the EVOH solution in the vessel will rise and EVOH will thermally deteriorate. Accordingly, the pressure is preferably between 1 and 6 kg/cm², more preferably between 1.5 and 5 kg/cm², even more preferably between 2 and 4 kg/cm².

In this method, the EVOH solution is kept in direct contact with water vapor in the vessel, and its alcohol content gradually decreases. At this stage, EVOH is in the form of a swollen paste, not gelled, and can be smoothly taken out of the vessel as it is still fluid.

EVOH dissolves in a water/methanol mixed solvent under atmospheric pressure, for example, at about 60° C. to 70° C., but does not dissolve in a solvent of water alone under atmospheric pressure. However, we have found that, even when EVOH contains substantially water alone, it is still fluid in the presence of pressurized water vapor at a temperature not lower than 100° C. As a result, we have made it possible to continuously treat EVOH with ease, for example, in a column vessel.

The aqueous EVOH composition to be taken out of the vessel contains from 0 to 10 parts by weight of an alcohol and from 10 to 1000 parts by weight of water, relative to 100 parts by weight of EVOH therein, and it is still fluid.

The alcohol content of the aqueous EVOH composition is preferably between 0 and 5 parts by weight, more preferably between 0 and 1 part by weight, even more preferably between 0 and 0.1 part by weight. As the alcohol content of the aqueous EVOH composition is lowered, alcohol vaporization is prevented by the post-treatment step of coagulating the composition, and good environmental conditions in and around the working areas can be maintained. In addition, even when the pellets can be kept of the EVOH composition are washed at an elevated temperature for removing the saponification catalyst residue, they do not stick together. Therefore, the temperature of the wash can be elevated, and, as a result, the washing speed can be increased.

The water content of the aqueous EVOH composition is between 10 and 1000 parts by weight. If the water content is smaller than 10 parts by weight, the fluidity of the composition in the vessel will be poor. Preferably, the water content is at least 30 parts by weight, more preferably at least 50 parts by weight. However, if the water content is greater than 1000 parts by weight, the EVOH composition can not be stably coagulated into strands. Moreover, in addition, the pellets produced by cutting the composition in melt often fuse together and their shape is not homogeneous. Thus, preferably, the water content is at most 500 parts by weight, more preferably at most 200 parts by weight.

The aqueous EVOH composition obtained in the manner as described herein generally contains from 0.1 to 5% by weight of an alkali metal salt based on the weight of the metal, and well as salt by-products and other impurities.

The method for producing an EVOH resin of the invention comprises another step of feeding the aqueous EVOH composition prepared in step 1, into an extruder, kneading it in melt therein, and then extruding the resin melt out of the extruder (step 2). In the method, the means of feeding the aqueous EVOH composition of step 1, into the extruder in step 2 is not specifically defined. For example, the aqueous EVOH composition from step 1 may be, cut into pellets and fed into the extruder in step 2; or uncut, it may be fed directly into the extruder while still in melt.

The embodiment of feeding the aqueous EVOH composition of step 1, into the extruder of step 2, after being cut into pellets, is described. In this embodiment, the aqueous EVOH composition of step 1 is cut into pellets. The method of cutting it into pellets is not specifically defined. For example, the molten aqueous EVOH composition may be extruded into strands in a coagulating bath, and the coagulated strands cut; or the aqueous EVOH composition may be directly cut in melt.

In the method of extruding it into strands in a coagulating bath followed by cutting, the aqueous EVOH composition from the vessel is first extruded in a coagulating bath through nozzles having a desired diameter. In this step, if the water content of the aqueous EVOH composition is too high, water will separate from the composition and the separated water will be jetted out of nozzles interfering with continuous formation of EVOH strands. Therefore, it is desirable to remove excess water from the aqueous EVOH composition by treating it in a kneader or the like, and thereafter the composition is extruded out through nozzles into strands in a coagulating bath. The kneader may be composed of a cylinder equipped with a liquid-discharging port, and a screw fitted therein.

The coagulating bath is usually water, but may contain a small amount of an alcohol. In a conventional method in which a methanol solution or water/methanol mixed solution of EVOH is extruded into a coagulating bath, methanol must be added to the coagulating bath so as to lower the specific gravity of the bath for preventing the extruded strands from floating in the bath before they coagulate. In the present invention, however, the coagulating bath may be water alone, since the coagulation rate of the extruded strands is high. The method of the invention is therefore superior to the conventional method since it is less harmful to the environment in and around the working areas.

Preferably, the temperature of the coagulating bath is between 0° C. and 50° C., and that of the molten aqueous EVOH composition to be extruded in the bath is between 100° C. and 150° C. The temperature difference allows rapid coagulation of the aqueous EVOH composition extruded into the bath. More preferably, the temperature of the coagulating bath is between 0° C. and 30° C., and that of the molten aqueous EVOH composition to be extruded in the bath is between 110° C. and 140° C.

The coagulated strands are cut with a cutter into pellets. The cutter is preferably a strand cutter.

Where the aqueous EVOH composition from the vessel is cut directly in melt, a hot cutting system or an under-water cutting system is preferred for the method. The nozzles through which the composition is extruded preferably have an orifice diameter of from 2 to 5 mmφ (where φ indicates a diameter), as pellets thus formed are easy to handle. FIG. 1 shows one example of a hot cutter for use in a hot cutting system. In this, 1 indicates an aqueous EVOH composition inlet port; 2 indicates a die; 3 indicates a rotary blade; 4 indicates a rotation axis; 5 indicates a cutter box; 6 indicates a cooling water inlet port; 7 indicates cooling water; 8 indicates a water membrane; 9 indicates a pellets take-out port; and 10 indicates cooling water and pellets.

If the water content of the aqueous EVOH composition is too high, water will separate from the aqueous EVOH composition and will be jetted out of nozzles thus interfering with stable cutting of the composition. Therefore, as in the case of cutting strands, it is desirable to remove excess water from the EVOH by treating it in a kneader or the like, before the composition is jetted out through nozzles and cut into pellets.

The EVOH pellets thus obtained generally contain the residue of the saponification catalyst, alkali metal salts. If the catalyst residue content is too high, it causes a quality problem of yellowing. Therefore, it is desirable to remove the catalyst residue by washing the pellets. The washing method is not specifically defined. For example, the pellets are washed by dipping them in water or an aqueous acid solution of acetic acid or the like.

The washing temperature may be between 0 and 95° C. From the viewpoint of higher washing efficiency, the washing temperature is preferably higher. However, if too high, it may cause the pellets to fuse. The lower limit of the washing temperature is preferably at least 20° C., more preferably at least 30° C., most preferably at least 40° C. In a conventional method, the washing temperature is between about 25° C. and 30° C. Compared with this, the washing temperature in the method of the invention may be high, which is another characteristic feature of the invention. The upper limit of the washing temperature is preferably at most 80° C., more preferably at most 70° C. After washing, the alkali metal salt content of the EVOH pellets is preferably at most 0.05% by weight in based on the weight of the metal, more preferably at most 0.03% by weight.

Alternatively, the pellets may be washed in the extruder in the next step 2. Needless-to-say, pellets washed in the manner described above may also be washed in the extruder in the next step 2. The method of washing in the step 2 will be described below.

Preferably, at least one additive selected from the group consisting of carboxylic acids, boron compounds, phosphoric acid compounds, alkali metal salts and alkaline earth metal salts is added to the EVOH pellets for improving the quality of the pellets such as the thermal stability of the pellets. The method of adding it to the pellets is not specifically defined, and any known method is employable. For example, the pellets may be dipped in an aqueous solution containing the additives so that they adsorb it.

Examples of carboxylic acids usable herein are oxalic acid, succinic acid, benzoic acid, citric acid, acetic acid, propionic acid and lactic acid. Preferably the additive is selected from acetic acid and propionic acid since they are inexpensive and easily available. If the carboxylic acid content of the dry EVOH pellets it is too small, the pellets will be yellowed while molded in melt; but if too large, interlayer adhesion of the EVOH moldings will be poor. Therefore, the carboxylic acid content of the dry EVOH pellets of the invention is preferably between 10 and 5000 ppm. The lower limit of the carboxylic acid content is preferably at least 30 ppm, more preferably at least 50 ppm. The upper limit of the carboxylic acid content is preferably at most 1000 ppm, more preferably at most 500 ppm.

Non limiting examples of boron compounds for use in the present invention are boric acids, borates, salts of boric acids, and boron hydrides. Boric acids include orthoboric acid, metaboric acid and tetraboric acid; borates include triethyl borate and trimethyl borate; and salts of boric acids include alkali metal salts and alkaline earth metal salts of various boric acids mentioned above, and borax. Of those compounds, orthoboric acid (referred to as boric acid)is preferred. If the boron compound content of the dry EVOH resin pellets is too small, the thermal stability of the pellets may not be optimum; but if too large, the pellets will often gel and their moldability may be poor. Therefore, the boron compound content is preferably between 10 and 2000 ppm in terms of boron, more preferably between 50 and 1000 ppm.

Examples of phosphoric acid compounds for use in the present invention are various acids such as phosphoric acid and phosphorous acid and their salts. Any phosphoric acid of any type of primary phosphates, secondary phosphates or tertiary phosphates may be added to the EVOH pellets. Preferred are alkali metal salts and alkaline earth metal salts. Sodium dihydrogenphosphate, potassium dihydrogenphosphate, disodium hydrogenphosphate and dipotassium hydrogenphosphate are most preferred for the phosphoric acid compound to be added to the EVOH pellets. The phosphoric acid compound content of the dry EVOH resin pellets of the invention is preferably between 1 and 1000 ppm in terms of the phosphate radical. Adding a phosphoric acid compound within this range, the EVOH moldings are prevented from being yellowed and from having gels and hard spots. If the phosphoric acid compound content is less than 1 ppm, the EVOH pellets may be yellowed when molded in melt; and if higher than 1000 ppm, the EVOH moldings may have gels and hard spots.

Examples of alkali metal salts usable herein are aliphatic carboxylates, aromatic carboxylates, phosphates and metal complexes. They include, for example, sodium acetate, potassium acetate, sodium phosphate, lithium phosphate, sodium stearate, potassium stearate and sodium ethylenediaminetetraacetate. Of those, preferred are sodium acetate, potassium acetate and sodium phosphate. The alkali metal salt content of the dry EVOH resin pellets of the invention is preferably between 5 and 5000 ppm, more preferably between 20 and 1000 ppm, even more preferably between 30 and 750 ppm in terms of the alkali metal element.

Examples of alkaline earth metal salts usable herein are magnesium salts, calcium salts, barium salts and beryllium salts. Especially preferred are magnesium salts and calcium salts. The anion of the alkaline earth metal salts is not specifically defined, however, acetates and phosphates are most preferred. The alkaline earth metal salt content of the dry EVOH resin pellets of the invention is preferably between 10 and 1000 ppm, more preferably between 20 and 500 ppm in terms of the metal. If the alkaline earth metal salt content thereof is smaller than 10 ppm, the long-run workability of the EVOH resin may be poor; but if larger than 1000 ppm, the EVOH resin may be yellowed when molded in melt.

The additive(s) may be added to the EVOH resin during step 1 or step 2 or both step 1 and step 2 of the method of the present invention. The method of adding the additive to the EVOH resin in the step 2 will be described below.

Method of washing the aqueous EVOH composition pellets, and methods of adding the additive to the aqueous EVOH composition pellets will be apparent to those skilled in the art. Exemplary methods are any of batch-process units or continuous-process units. Especially preferred in view of superior productivity is a method of continuously feeding and processing the pellets in a column vessel. The washing operation and the additive-adding operation may be effected at the same time in one and the same processing column, or may be effected separately in different processing columns.

After optionally washing and/or mixing with an additive as described above, the resulting, aqueous EVOH composition pellets are fed into an extruder for the next step 2.

If uncut, the aqueous EVOH composition from step 1 while still in melt, may be fed directly into an extruder for the next step 2. In this case, the operation of washing the composition and the operation of adding the additive to the composition are preferably effected in the step 2. Amorphous crumbs of solidified EVOH paste may also be fed into an extruder for the step 2.

In the step 2 of the invention, the aqueous EVOH composition prepared in the previous step 1 is fed into an extruder, kneaded in melt therein, and then extruded out of the extruder. The step 2 is described below.

The extruder is preferably a twin-screw extruder, in which, more preferably, the two screws rotate in the same direction. Also preferably, its L/D is at least 15. The cylinder of the extruder is preferably a block cylinder. Also preferably, the screws are of a segment type.

Before being fed into the extruder in the step 2, the water content of the aqueous EVOH composition is preferably at least 10% by weight, more preferably at least 30% by weight, even more preferably at least 50% by weight. Also preferably, the water content of EVOH before being fed into the extruder in the step 2 is at most 1000% by weight, more preferably at most 500% by weight, even more preferably at most 200% by weight. Having the water content falling within the preferred range before being fed into the extruder, means that the aqueous EVOH composition may be kneaded in melt in the extruder at a temperature lower than the melting point of the dry EVOH, and can be stably extruded out of the extruder without thermal degradation.

If the water content of the aqueous EVOH composition is lower than 10% by weight before being fed into the extruder, thermal degradation of the EVOH in the extruder may occur. If, on the other hand, the water content of the aqueous EVOH composition is higher than 1000% by weight, water will separate from EVOH and the amount of the EVOH composition fed into the extruder will fluctuate resulting in less than optimum extrusion stability of the resin melt in the step 2.

Preferably, the resin temperature in the extruder in step 2 is between 70 and 170° C. If the resin temperature is lower than 70° C., the aqueous EVOH composition may not completely melt. In addition, when at least one additive selected from carboxylic acids, boron compounds, phosphoric acid compounds, alkali metal salts and alkaline earth metal salts is added to the resin composition, its efficacy in improving the dispersibility will be reduced if the resin temperature is too low. More preferably, the resin temperature in the extruder is not lower than 80° C., even more preferably not lower than 90° C. If, however, the resin temperature is higher than 170° C., EVOH may be thermally degraded. Additionally, if the additive is added to the resin composition as an aqueous solution, much of the water will evaporate if the resin temperature is higher than 170° C. In which case the aqueous solution may not have the desired water content and may not mix well with the aqueous EVOH composition. Preferably, the resin temperature is not higher than 150° C., more preferably not higher than 130° C. The method of controlling the resin temperature is not specifically defined. For example, one preferred method is to suitably control the cylinder temperature in the extruder. In the present invention, the resin temperature denotes a temperature detected by the temperature sensor provided at the cylinder of the extruder, and detected around the discharge portion at the tip of the extruder.

In step 2, saponification catalyst residue remaining in the EVOH can be washed away in the extruder. Thus, after the aqueous EVOH composition is fed into the extruder, a wash may be fed thereinto and discharged from the extruder downstream of the wash inlet site. This method is favorable as it enables efficient and space-saving washing of the resin. In this case, the saponification catalyst residue remaining in EVOH to be fed into the extruder is preferably an alkali metal salt.

Preferably, the alkali metal salt content of the aqueous EVOH composition to be fed into the extruder in step 2 is between 0.1 and 5% by weight in terms of the metal, more preferably at least 0.2% by weight, even more preferably at least 0.5% by weight. Also more preferably, it is at most 4% by weight, even more preferably at most 3% by weight. If the content is smaller than 0.1% by weight, any conventional washing method may realize good space-saving. On the other hand, if the catalyst residue content is greater than 5% by weight, it is undesirable as requiring an extruder having a large aspect ratio L/D and increasing the washing cost.

Also preferably, the alkali metal salt content of the EVOH resin washed in the manner as above is at most 0.05% by weight in terms of the metal, more preferably at most 0.04% by weight, even more preferably at most 0.03% by weight. If the content is greater than 0.05% by weight, it is undesirable as the thermal stability of EVOH is low.

The wash to be used herein is not specifically defined so long as it can remove the saponification catalyst residue from EVOH. Preferably it is, for example, an aqueous solution of an acid having a pKa at 25° C. of at least 3.5. An aqueous solution of an acid having a pKa at 25° C. of less than 3.5 is undesirable, as the EVOH resin washed with it may lose good yellowing resistance and good delamination resistance. Suitable acids having a pKa of at least 3.5, are carboxylic acids, preferably acetic acid and propionic acid since they are inexpensive. The acid concentration of the aqueous acid solution for the wash is preferably between 0.01 and 10 g/liter, more preferably between 0.1 and 2 g/liter. Also preferably, the amount of the wash to be introduced into the extruder is between 0.1 and 100 liters/kg of resin.

Any conventional method of introducing the wash into the extruder is contemplated. For example, the wash may be introduced under pressure with a plunger pump. Similarly any conventional method of discharging the wash is contemplated so long as the discharge occurs downstream of the wash inlet. Suitably the discharge unit is a water-discharging slit or hole. If desired, plural wash inlets or plural wash discharge sites may be disposed in the extruder.

Preferably the aqueous EVOH composition is, after washing if carried out, dewatered or degassed in the extruder. For example, water and/or water vapor is discharged through at least one site of the extruder such as a dewatering slit or hole or a vent disposed through the cylinder in the extruder. The dewatering slit is preferably a wedge wire slit or screen mesh slit for dewatering. The vent may be a vacuum vent for removing water vapor under reduced pressure, or an open vent for removing water vapor under atmospheric pressure.

Preferably it is a dewatering slit or hole. These may discharge water and water vapor, and therefore enable efficient water removal from resin of high water content. Thus, they are more effective than a vent that may generally discharge water vapor only. In case where water vapor is discharged through a vent, resin will often deposit around its mouth potentially contaminating the extruder. In view of this, a dewatering slit or hole is preferred to a vent. On the other hand, when a dewatering hole is used for water or water vapor removal, a resin melt may be forced out through it. Thus, a dewatering slit is preferred to such a dewatering hole.

For dewatering the aqueous EVOH resin, one dewatering unit may be used alone, or plural dewatering units of the same type may be used, or plural dewatering units of different types may be combined. For example, water is first removed from resin of high water content in some degree through a dewatering slit, and thereafter the thus-dewatered resin may be further dewatered through a vent disposed downstream the dewatering slit.

The dewatering operation mentioned above is for controlling the water content of the EVOH resin being processed in the extruder and after extruded out of it. In order to prevent the water content of the EVOH resin from being too much lowered, it is desirable to supply water into the extruder in addition to the dewatering operation or without effecting the dewatering operation. An exemplary method of supplying water to the extruder is a plunger pump under pressure.

Preferably, the water content of the EVOH resin extruded in step 2 is between 5 and 40% by weight, more preferably between 5 and 35% by weight. If the water content of the extruded EVOH resin is greater than 40% by weight, water may separate from EVOH and may cause the extruded EVOH strands to foam. On the other hand, if the water content of the extruded EVOH resin is less than 5% by weight, EVOH may be thermally degraded in the extruder and may be often be yellowed.

After the EVOH resin has been optionally washed and its water content optionally controlled in the extruder, at least one additive selected from carboxylic acids, boron compounds, phosphoric acid compounds, alkali metal salts and alkaline earth metal salts may be added thereto for improving the properties of the EVOH resin. The preferred range of the amount of the additive is mentioned below. The additive(s) may be added one at a time or all at a time depending on their use. The effect and the preferred amounts of the additives, are mentioned above in the section relating to the treatment of the aqueous EVOH composition pellets prepared in step 1.

Adding the additive to the EVOH resin in the extruder is advantageous as producing an extremely uniform resin melt. This embodiment ensures good EVOH resin. The advantages of the EVOH resin produced in this embodiment are that its extrusion stability is good, its yellowing resistance is good, it is well processed even in long-run molding lines, its moldings have few gels and hard spots, and it deposits little on the die in the extruder used. When the additive is added to the EVOH resin in the extruder, it is desirable that the additive is supplied into the extruder in the site in which the EVOH resin is in melt. Adding the additive to the EVOH resin in that condition in the extruder enhances the effect of the invention. In particular, it is more desirable that the additive is added to the EVOH resin melt that contains water. Preferably, the extruder is equipped with a kneading portion. More preferably, the additive is added to the EVOH resin in the kneading portion of the extruder, as it can be uniformly mixed with the EVOH resin. In addition to the above-mentioned alkali metal salts and alkaline earth metal salts other metal salts of Group 4 of the Periodic Table may serve as an additive.

The additive may be fed into the extruder in any suitable form for example, as a dry powder, as a paste in a solvent, as a suspension in a liquid, or a solution in a solvent. Of these, especially preferred as ensuring uniform dispersion of the additive in the EVOH resin is the additive solution in a solvent. Preferably the solvent is water, as the additive is readily soluble and water is inexpensive, easy to handle and safe. Preferably, the additive is fed into the extruder through one or more sites.

Where the additive is added to the EVOH resin as a solution, its amount is preferably at least 1 part by weight, more preferably at least 3 parts by weight, even more preferably at least 5 parts by weight relative to 100 parts by weight of the dry EVOH resin. Also preferably, its amount is at most 50 parts by weight, more preferably at most 30 parts by weight, even more preferably at most 20 parts by weight relative to 100 parts by weight of dry EVOH resin. If the amount of the added solution is less than 1 part by weight, the concentration of the solution must be high. However, this is not preferred since the additive of such a thick solution may not disperse well in the EVOH resin. On the other hand, if the amount of the solution added is greater than 50 parts by weight, the water content of EVOH may be difficult to control and water may separate from EVOH in the extruder.

In the conventional method of dipping EVOH resin pellets in a solution of the additive, products of good quality are difficult to obtain from the crumbed deposit of EVOH resin. However, the present invention has made it possible to uniformly add the additive, thereby realizing the production of EVOH resin products of good and stabile quality.

The method of pelletizing the EVOH resin extruded out of the extruder in step 2 is not specifically defined. For example, the resin composition is extruded into strands in a coagulating bath through the die of the extruder, and the strands may be cut into pellets having a predetermined length. For easy handling of the pellets, the aperture of the die is preferably between 2 and 5 mmφ; and the strands are cut into pellets preferably having a length of from about 1 to about 5 mm. A hot cut system and an under-water cut system are preferred examples of the pelletization.

The pellets are generally dried. After drying, the water content of the EVOH resin pellets is preferably at most 1.0% by weight, more preferably at most 0.5% by weight. A preferred method of drying is ventilation drying or fluidized drying. However, any suitable method known in the art will suffice. Multi-stage drying combining more than one different drying method may also be employed herein. Especially preferred is a method of first drying the pellets by fluidized drying and further drying them by ventilation drying.

In the conventional processing method of dipping EVOH resin pellets in a treating solution that contains the additive, the water content of the processed EVOH resin pellets generally is between 40 and 70% by weight or so. In the processing method of the invention, however, the water content of the extruded EVOH resin may be controlled in any desired manner. Preferably, the water content of the EVOH extruded resin is between 5 and 40% by weight. Accordingly, the present invention permits production of EVOH resin pellets having water content of less than those obtained in the conventional method. The pellets are favorable as reducing the energy consumption in the process of drying them.

In particular, EVOH pellets having a water content of greater than 40% by weight will often fuse together when dried at a temperature of 100° C. or higher. Thus, the processing method of the invention in which EVOH is melted in an extruder and the additive is added thereto is favorable.

If desired, the EVOH resin pellets obtained in the method of the invention may be blended with any other EVOH that differs from them in the degree of polymerization, the ethylene content and the degree of saponification, and the resulting resin blend may be molded in melt. Also if desired, any other additives may suitably be added to the pellets. The additives include, for example, plasticizer, lubricant, stabilizer, surfactant, colorant, UV absorbent, antistatic agent, drying agent, crosslinking agent, metal salt, filler, and reinforcing agent such as fibers.

The EVOH resin pellets thus obtained in the invention can be molded in melt, for example, into various moldings such as films, sheets, containers, pipes and fibers. The moldings of the invention are especially favorable for wrapping and packaging various objects.

EXAMPLES

The invention is described in more detail with reference to the following Examples, which, however, are not intended to restrict the scope of the invention. Unless otherwise specifically indicated, "%" and "part" are all by weight.

(1) Measurement of Water Content

A 20 g sample of EVOH is placed in a well-dried weighing bottle, and dried in a hot air drier at 120° C. for 24 hours. From the weight change of EVOH before and after drying, the water content of EVOH is obtained according to the formula (1):

$$\text{Water Content (\% by weight)} = (\text{weight before dried} - \text{weight after dried})/(\text{weight before dried}) \times 100 \quad (1)$$

(2) Quantitative Determination of Minor Components Added

The minor components added to EVOH are quantitatively determined according to the following methods.

(2-a) Quantitative Determination of Carboxylic Acid

A 20 g sample of dry pellets is put into 100 ml of ion-exchanged water, and extracted under heat at 95° C. for 6 hours. The resulting extract is titered for neutralization with aqueous 1/50 N NaOH solution, using phenolphthalein as an indicator, to determine the carboxylic acid content of the sample.

(2-b) Quantitative Determination of Alkali Metal Salt and Alkaline Earth Metal Salt A 10 g sample of dry pellets is put into 50 ml of aqueous 0.01 N HCl solution, and stirred at 95° C. for 6 hours. The aqueous solution is then analyzed by ion chromatography. The column used is Yokogawa Electric's ICS-C25, and the eluent used is an aqueous solution containing 5.0 mM tartaric acid and 1.0 mM 2,6-pyridinedicarboxylic acid. The quantitative determination is based on the calibration curves of the respective, aqueous metal chloride solutions. The data of the alkali metal salt and the alkaline earth metal salt in the dry pellets are represented in terms of the metal.

2-c) Quantitative Determination of Boron Compound

An aqueous $Na_2CO_3$ solution is added to a sample of dry pellets, and ashed in a platinum crucible at 600° C. The ashed sample is dissolved in hydrochloric acid, and analyzed through ICP emission spectrometry. The thus-obtained boron compound content of the sample is represented in terms of the boron.

(2-d) Quantitative Determination of Phosphoric Acid Compound

A 10 g sample of dry pellets is put into 50 ml of aqueous 0.01 N HCl solution, and stirred at 95° C. for 6 hours. The aqueous solution is analyzed through ion chromatography, in which the column used is Yokogawa Electric's ICS-A23, and the eluent used is an aqueous solution containing 2.5 mM sodium carbonate and 1.0 mM sodium hydrogencarbonate. The quantitative determination is based on the calibration curve of an aqueous phosphoric acid solution. From the thus-obtained data of the phosphate ions, the phosphoric acid compound content of the sample is obtained in terms of the phosphate radical.

(3) Melt Index (MI)

Measured according to ASTM-D1238 using a melt indexer, at a temperature of 190° C. under a load of 2160 g.

Example 1

Figure 2:
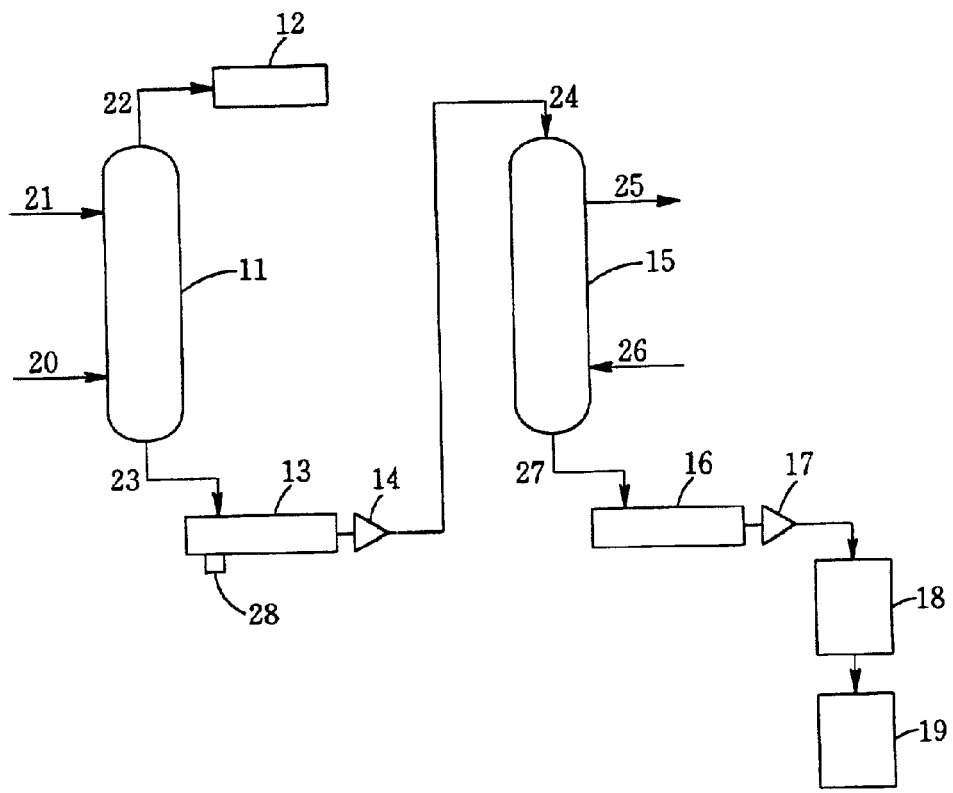
FIG. 2 is an outline view showing the process of Example 1.

An outline of the process of Example 1 is shown in FIG. 2. An EVOH solution containing 100 parts by weight of EVOH having an ethylene content of 32 mol % and a degree of saponification of 99.5 mol %, 100 parts by weight of methanol, 50 parts by weight of water and 2 parts by weight, in terms of sodium, of sodium acetate was continuously introduced into the 10-tier plate column 11 having a column diameter of 0.3 m, at its uppermost tier through the EVOH solution supply duct 21 at a feed rate of 52 kg/hr, while water vapor was jetted thereinto at the lowermost tier of the column through the water vapor supply duct 20 at a flow rate of 86 kg/hr, so that the EVOH solution was contacted with water vapor in countercurrent flow in the column. The temperature in the column was 130° C., and the pressure therein was 3 kg/cm². The methanol vapor and water vapor evaporated out of the top of the column via the vapor discharge duct 22 and was condensed in the condenser 12, and the resulting aqueous methanol solution was recovered. The aqueous EVOH composition thus produced was continuously removed from the bottom of the column via the aqueous composition take-out duct 23. This contained 0.05 parts by weight of methanol, 105 parts by weight of water and 2 parts by weight, in terms of sodium, of sodium acetate, relative to 100 parts by weight of EVOH therein.

Next, the aqueous EVOH composition was transferred into the kneader 13 equipped with a discharge port 28 and having a diameter of 50 mm and a length of 660 mm (L/D=13.2), at a feed rate of 41 kg/hr. The screw revolution in the kneader was 100 rpm. The aqueous EVOH composition thus led out through the discharge port contained 0.03 parts by weight of methanol, 63 parts by weight of water (water content, 39%) and 1.2 parts by weight, in terms of sodium, of sodium acetate relative to 100 parts by weight of EVOH therein, and its temperature was 118° C. Next, this was extruded out through a die with six 3-mmϕ holes, and cut with the hot cutter 14 into pellets (A). The hot cutter has four blades, and it was spaced from the die by 0.05 mm. The cutter blade revolution was 1200 rpm.

The resulting pellets (A) were fed into the column vessel 15 having a diameter of 0.8 m and a height of 4 m, through its top via the pellet supply duct 24 at a feed rate of 33 kg/hr. An aqueous acetic acid solution (0.5 g/liter, 50° C.) was fed into the vessel through its lower part via the solution supply duct 26 at a feed rate of 500 liters/hr. Thus, the pellets were contacted with the aqueous acetic acid solution in countercurrent flow in the vessel. The aqueous acetic acid solution was discharged out of the vessel through the solution discharge duct 25, while the washed pellets (B) were continuously taken out through the bottom of the vessel via the pellet take-out duct 27. The pellets (B) had a water content of 39%, and still contained 0.002% by weight, in terms of sodium, of sodium acetate. While washed, the pellets did not fuse together.

Next, the pellets (B) were put into the twin-screw extruder 16. The resin temperature around the take-out port was 100° C. At the take-out side of the extruder, was disposed a minor component supply unit 31 as in FIG. 3. Through the supply unit 31, an aqueous treating solution comprising aqueous acetic acid/boric acid/sodium acetate/magnesium acetate/potassium dihydrogenphosphate was fed into the extruder. The feed rate of EVOH is 10.7 kg/hr (containing water), and the feed rate of the treating solution was 0.65 liters/hr. The aqueous treating solution contained 4.3 g/liter of acetic acid, 15 g/liter of boric acid, 4.6 g/liter of sodium acetate, 3.0 g/liter of magnesium acetate tetrahydrate, and 1.4 g/liter of potassium dihydrogenphosphate. The details of the twin-screw extruder are mentioned below.

Type: twin-screw extruder,
L/D: 45.5,
Diameter: 30 mmϕ,
Screw: uniaxial full engaging type,
Screw revolution: 300 rpm,
Cylinder temperature: 100°0 C.,
Die temperature: 105° C.,
Number of die holes: 5 (3 mmϕ).

Figure 3:
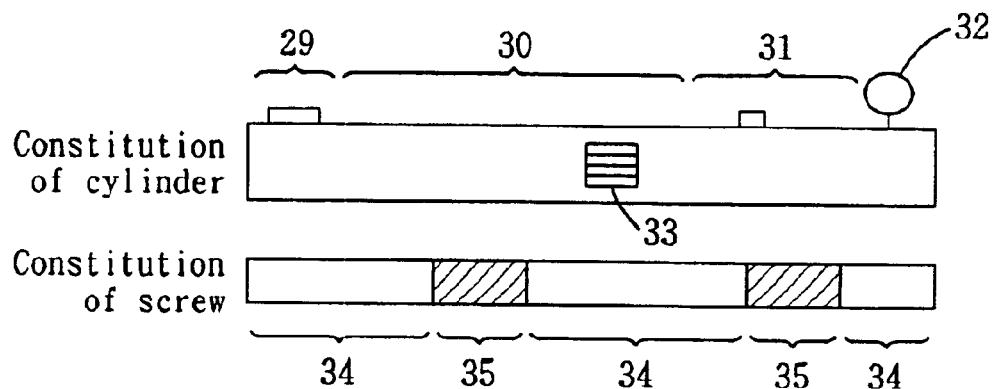
FIG. 3 is a schematic view showing the constitution of the twin-screw extruder used in Example 1.

The constitution of the twin-screw extruder is shown in detail in FIG. 3. The extruder comprises a raw material supply unit 29, a dewatering unit 30, and a minor component supply unit 31, and the dewatering unit is equipped with a wedge wire-type dewatering slit 33. For the screws, a full-flight screw 34 is combined with a reverse-flight screw 35, as illustrated. At the tip of the cylinder, disposed is a temperature sensor 32.

The EVOH resin melt thus processed in the extruder was cut with the hot cutter 17 into pellets (C). The water content of the pellets (C) was 20% by weight. The thus-obtained pellets (C) were dried in the fluidized drier 18 at 90° C. for 15 hours, and then in the ventilation drier 19 at 105° C. for 15 hours. Their water content reduced to 0.2% by weight. After drying, the acetic acid content of the EVOH resin pellets (D) was 300 ppm, the boron compound content was 270 ppm in terms of boron, and the phosphoric acid compound content was 98 ppm in terms of phosphate radical. Regarding the alkali metal salt content of the pellets, the potassium salt content was 40 ppm in terms of metal, and the sodium salt content thereof was 130 ppm in terms of metal. Regarding the alkaline earth metal content of the pellets, the magnesium salt content was 35 ppm in terms of metal. MI of the pellets was 1.5 g/10 min.

Example 2

The pellets (A) of Example 1 were fed into the column vessel having a diameter of 0.8 m and a height of 4 m through its top at a feed rate of 33 kg/hr. An aqueous treating solution comprising acetic acid/sodium acetate/magnesium acetate/potassium dihydrogenphosphate (50° C.) was fed into the vessel through its lower part at a feed rate of 500 liters/hr. The treating solution contained 1.7 g/liter of acetic acid, 0.67 g/liter of sodium acetate, 1.84 g/liter of magnesium acetate tetrahydrate and 0.77 g/liter of potassium dihydrogenphosphate. The treated pellets were continuously taken out through the bottom of the vessel. The pellets had a water content of 39%.

Next, the pellets were put into a twin-screw extruder, of which the constitution is the same as in FIG. 3 except that the screw at the site for minor component supply was changed to a full-flight screw. The resin temperature around the take-out port was 100° C.; and the feed rate of EVOH was 10.7 kg/hr (containing water). No minor component was fed into the extruder. After extrusions the EVOH resin pellets had a water content of 18% by weight. The pellets were dried in the fluidized drier at 90° C. for 15 hours, and then in the ventilation drier at 105° C. for 15 hours. Their water content reduced to 0.2% by weight. After drying, the acetic acid content of the EVOH resin pellets was 200 ppm, and the phosphoric acid compound content was 90 ppm in terms of phosphate radical. Regarding the alkali metal salt content of the pellets, the potassium salt content was 35 ppm in terms of metal, and the sodium salt content was 120 ppm in terms of metal. Regarding the alkaline earth metal content of the pellets, the magnesium salt content was 60 ppm in terms of metal. MI of the pellets was 12 g/10 min.

Example 3

An EVOH solution containing 100 parts by weight of EVOH having an ethylene content of 35 mol % and a degree of saponification of 99.5 mol %, 100 parts by weight of methanol, 50 parts by weight of water and 1.5 parts by weight, in terms of sodium, of sodium acetate was continuously introduced into the 10-tier plate column having a column diameter of 0.3 m, at its uppermost tier at a feed rate of 52 kg/hr, while water vapor was jetted thereinto at the lowermost tier of the column at a flow rate of 86 kg/hr, so that the EVOH solution was contacted with water vapor in countercurrent flow in the column. The temperature in the column was 130° C., and the pressure therein was 3 kg/cm².

The methanol vapor and water vapor that evaporated out of the column through its top was condensed in the condenser, and the resulting aqueous methanol solution was recovered. The aqueous EVOH composition thus produced was continuously removed from the bottom of the column. The aqueous EVOH composition contained 0.04 parts by weight of methanol, 105 parts by weight of water and 1.5 parts by weight, in terms of sodium, of sodium acetate, relative to 100 parts by weight of EVOH therein.

Figure 4:
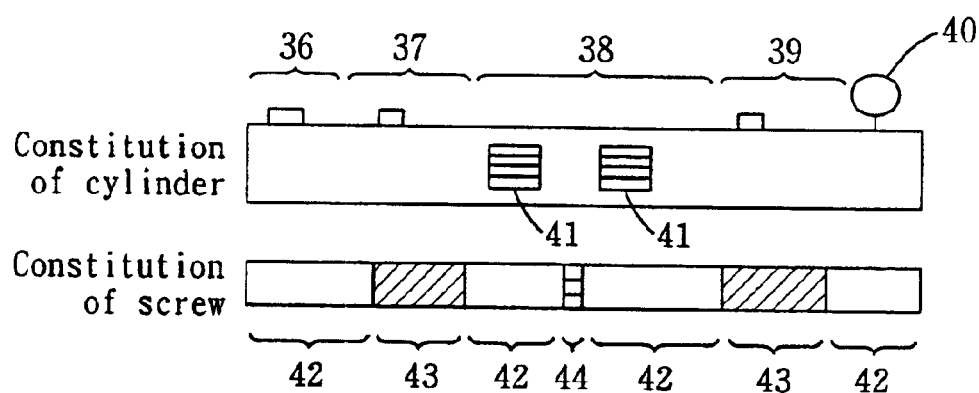
FIG. 4 is a schematic view showing the constitution of the twin-screw extruder used in Example 3.

Next, the aqueous EVOH composition was fed into the twin-screw extruder shown in FIG. 4. Its feed rate was 50 kg/hr (containing water). An aqueous acetic acid solution (0.5 g/liter) was fed into the extruder through the wash supply unit 37 at a feed rate of 600 liters/hr; and an aqueous treating solution comprising acetic acid/boric acid/sodium acetate/magnesium acetate/potassium dihydrogenphosphate was fed thereinto through the minor component supply unit 39. The feed rate of the treating solution was 2.4 liters/hr. The treating solution contained 5.0 g/liter of acetic acid, 15 g/liter of boric acid, 4.6 g/liter of sodium acetate, 3.0 g/liter of magnesium acetate tetrahydrate and 1.4 g/liter of potassium dihydrogenphosphate. The details of the twin-screw extruder used herein are mentioned below.

Type: twin-screw extruder,
L/D: 45.5,
Diameter: 47 mmφ,
Screw: uniaxial full engaging type,
Screw revolution: 450 rpm,
Cylinder temperature: 95° C.,
Die temperature: 120° C.
Number of die holes: 5 (3 mmφ).

The twin-screw extruder is shown in detail in FIG. 4. The extruder comprises a raw material supply unit 36, a wash supply unit 37, a dewatering unit 38, and a minor component supply unit 39, and the dewatering unit is equipped with a wedge wire-type dewatering slits 41. For the screws, a full-flight screw 42 is combined with a reverse-flight screw 43 as illustrated, and a seal ring 44 is fitted thereto. At the tip of the cylinder, disposed is a temperature sensor 40.

The EVOH resin melt thus processed in the extruder was cut with the hot cutter into pellets (C'). Thus extruded and cut, the water content of the EVOH resin pellets was 23% by weight. The pellets were dried in the fluidized drier at 90° C. for 15 hours, and then in the ventilation drier at 105° C. for 15 hours. Their water content reduced to 0.1% by weight. After drying, the acetic acid content of the EVOH resin pellets (D') was 320 ppm, the boron compound content was 270 ppm in terms of boron, and the phosphoric acid compound content was 100 ppm in terms of phosphate radical. Regarding the alkali metal salt content of the pellets, the potassium salt content thereof was 38 ppm in terms of metal, and the sodium salt content was 170 ppm in terms of metal. Regarding the alkaline earth metal content of the pellets, the magnesium salt content was 40 ppm in terms of metal. MI of the pellets was 1.7 g/10 min.

Comparative Example 1

An EVOH solution containing 100 parts by weight of EVOH having an ethylene content of 32 mol % and a degree of saponification of 99.5 mol %, 100 parts by weight of methanol, 50 parts by weight of water and 2 parts by weight, in terms of sodium, of sodium acetate was extruded through the circular hole of a metal plate into a coagulation bath containing 10% aqueous methanol solution, and coagulated into strands, which were then cut with a strand cutter into pellets having a diameter of about 3 mm and a length of about 5 mm. Methanol evaporated from the coagulating bath, and the methanol concentration around the bath was 180 ppm. This worsened the environment in the working area.

The pellets were fed into the same column vessel having a diameter of 0.8 m and a height of 4 m as in Example 1, through its top at a feed rate of 33 kg/hr (containing the aqueous methanol solution), while an aqueous acetic acid solution (0.5 g/liter, 50° C.) was fed thereinto through its lower part at a feed rate of 500 liters/hr, and the washed pellets were continuously taken out of the processor through its bottom. In this process, the pellets were difficult to remove as they had a tendency to fuse, and the line was difficult to continuously drive. The water content of the pellets obtained herein was 55%;and the sodium acetate content thereof was 0.008% by weight in terms of sodium.

3.5 kg of the EVOH resin pellets (having a water content of 55% by weight) obtained herein were dipped in 6 liters of an aqueous solution containing 0.4 g/liter of acetic acid, 0.4 g/liter of sodium acetate, 0.3 g/liter of magnesium acetate, 0.1 g/liter of potassium dihydrogenphosphate and 0.7 g/liter of boric acid, at 25° C. for 6 hours. After dipping, they were dewatered, and the resulting EVOH resin pellets (having a water content of 55% by weight) were dried in a fluidized drier at 80° C. for 15 hours and then in a ventilation drier at 100° C. for 24 hours. The dried pellets had a water content of 0.3%.

The acetic acid content of the dried EVOH resin pellets was 300 ppm; the boron compound content was 270 ppm in terms of boron; and the phosphoric acid compound content was 100 ppm in terms of phosphate radical. Regarding the alkali metal salt contents of the pellets, the potassium salt content was 40 ppm in terms of metal, and the sodium salt content was 130 ppm in terms of metal. Regarding the alkaline earth metal content of the pellets, the magnesium salt content was 36 ppm in terms of metal. MI of the pellets was 1.5 g/10 min.

As described in detail hereinabove with reference to its preferred embodiments, the present invention provides a method for producing an EVOH resin that ensures efficient removal of alcohol without worsening the working environment. It also provides a method for producing pellets of the EVOH resin, of which the advantage is that it enables stable production and rapid washing of the pellets.

The EVOH resin pellets thus produced can enjoy stable extrusion and thermal stability in long-run extrusion working lines.

While the invention has been described in detail and with reference to specific embodiments thereof, it will be apparent to one skilled in the art that various changes and modifications can be made therein without departing from the spirit and scope thereof.

What is claimed is:

1. A method for producing an ethylene-vinyl alcohol copolymer resin, which comprises:
   (a) introducing into an apparatus an ethylene-vinyl alcohol copolymer solution that contains at least 50 parts by weight of an alcohol having a boiling point of not higher than 100° C., relative to 100 parts by weight of the ethylene-vinyl alcohol copolymer;
   (b) contacting the ethylene-vinyl alcohol copolymer solution with water in the apparatus, thereby letting alcohol along with water out of the apparatus, and obtaining an aqueous ethylene-vinyl alcohol copolymer composition that contains from 0 to 10 parts by weight of the alcohol and from 10 to 1000 parts by weight of water, relative to 100 parts by weight of the ethylene-vinyl alcohol copolymer;
   (c) transferring the aqueous ethylene-vinyl alcohol copolymer composition out of the apparatus;
   (d) feeding the aqueous ethylene-vinyl alcohol copolymer composition into an extruder;
   (e) kneading the aqueous ethylene-vinyl alcohol copolymer composition in melt in said extruder; and
   (f) then extruding the copolymer out of the extruder to obtain an extruded ethylene-vinyl alcohol copolymer resin.

2. The method of claim 1, wherein an ethylene content of the ethylene-vinyl alcohol copolymer is between 3 and 70 mol % and a degree of saponification of the ethylene-vinyl alcohol copolymer is at least 80 mol %.

3. The method of claim 1, wherein the alcohol is methanol.

4. The method of claim 1, wherein the ethylene-vinyl alcohol copolymer solution is contacted with water vapor in the apparatus.

5. The method of claim 4, wherein the ethylene-vinyl alcohol copolymer solution is continuously introduced into a column vessel and contacted with water vapor in the apparatus.

6. The method of claim 5, wherein the ethylene-vinyl alcohol copolymer solution is introduced into the apparatus through its upper part and water vapor is introduced into the apparatus through its lower part thereby causing the ethylene-vinyl alcohol copolymer solution to contact the water vapor in countercurrent flow, and the resulting aqueous ethylene-vinyl alcohol copolymer composition is transferred out of the apparatus through its lower part with alcohol being let out along with water vapor through its upper part.

7. The method of claim 1, wherein a temperature of the resin melt in the extruder is between 70 and 170° C.

8. The method of claim 1, wherein a water content of the extruded ethylene-vinyl alcohol copolymer resin melt is between 5 and 40% by weight.

9. The method of claim 1, further comprising feeding water into the extruder or removing excess water from the extruder to control the water content of the resin in the extruder.

10. The method of claim 1, wherein the aqueous ethylene-vinyl alcohol copolymer composition is kneaded in melt in the extruder with at least one additive selected from the group consisting of carboxylic acids, boron compounds, phosphoric acid compounds, alkali metal salts, alkaline earth metal salts and mixtures thereof.

11. The method of claim 10, wherein the additive is introduced into the extruder as an aqueous solution.

12. The method of claim 1, further comprising:
    introducing a wash into the extruder and discharging said wash from the extruder through at least one site downstream from the wash inlet site to remove a saponification catalyst residue from the resin melt.

13. The method of claim 1, further comprising
    cutting the aqueous ethylene-vinyl alcohol copolymer composition into pellets prior to being fed into the extruder.

14. The method of claim 13, further comprising
    dipping the pellets in a wash to remove a saponification catalyst residue prior to being fed into the extruder.

15. The method of claim 14, wherein the pellets are continuously washed in a column vessel.

16. The method of claim 13, wherein the pellets are dipped in an aqueous solution containing at least one additive selected from the group consisting of carboxylic acids, boron compounds, phosphoric acid compounds, alkali metal salts, alkaline earth metal salts and mixtures thereof prior to being fed into the extruder.

17. The method of claim 1, wherein the aqueous ethylene-vinyl alcohol copolymer composition is fed, uncut, into the extruder.

18. The method of claim 17, wherein the aqueous ethylene-vinyl alcohol copolymer composition is fed, uncut, into the extruder and a wash is fed into the extruder and discharged from the extruder through at least one site downstream from the wash inlet site to remove a saponification catalyst residue from the resin melt.

19. A method for producing ethylene-vinyl alcohol copolymer resin pellets, which comprises:
- cutting the extruded ethylene-vinyl alcohol copolymer resin obtained by the method of claim 1.

20. The method of claim 19, further comprising:
- drying and cutting the pellets to have a water content of at most 1% by weight.

* * * * *

UNITED STATES PATENT AND TRADEMARK OFFICE
CERTIFICATE OF CORRECTION

PATENT NO. : 6,838,029 B2
DATED : January 4, 2005
INVENTOR(S) : Kawahara et al.

It is certified that error appears in the above-identified patent and that said Letters Patent is hereby corrected as shown below:

<u>Title page,</u>
Insert Item -- [45] Date of Patent:      *Jan. 4, 2005 --.
Insert Item -- [*] Notice: Subject to any disclaimer, the term of this
                  patent is extended or adjusted under 35 U.S.C.
                  154 (b) by 428 days.

This patent is subject to a terminal disclaimer --.

Signed and Sealed this

Fourth Day of April, 2006

JON W. DUDAS
*Director of the United States Patent and Trademark Office*